(12) United States Patent
Maekawa

(10) Patent No.: US 7,640,294 B2
(45) Date of Patent: Dec. 29, 2009

(54) IMAGE PROCESSOR AND IMAGE PROCESSING METHOD

(75) Inventor: Shinichiro Maekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 10/991,116

(22) Filed: Nov. 16, 2004

(65) Prior Publication Data

US 2005/0111013 A1 May 26, 2005

(30) Foreign Application Priority Data

Nov. 21, 2003 (JP) ............................. 2003-393079

(51) Int. Cl.
*G06K 15/00* (2006.01)
*G06F 13/00* (2006.01)
(52) U.S. Cl. ...................... 709/203; 709/224; 709/227; 358/1.2; 358/1.16
(58) Field of Classification Search ................. 709/203, 709/206, 227, 224, 228; 358/1.16, 1.2
See application file for complete search history.

(56) References Cited

U.S. PATENT DOCUMENTS

| | | | | |
|---|---|---|---|---|
| 5,572,631 A | * | 11/1996 | Kavathekar et al. | 358/1.16 |
| 5,572,632 A | * | 11/1996 | Laumeyer et al. | 358/1.17 |
| 5,828,814 A | * | 10/1998 | Cyman et al. | 358/1.2 |
| 6,342,954 B1 | * | 1/2002 | Hisatomi et al. | 358/403 |
| 6,611,260 B1 | * | 8/2003 | Greenberg et al. | 345/204 |
| 7,065,263 B2 | * | 6/2006 | Ueda | 382/298 |
| 7,286,256 B2 | * | 10/2007 | Herbert | 358/1.16 |
| 2004/0008372 A1 | * | 1/2004 | Akashi et al. | 358/1.15 |
| 2005/0162449 A1 | * | 7/2005 | Silverbrook | 347/5 |
| 2006/0024107 A1 | * | 2/2006 | Lyman et al. | 400/88 |

FOREIGN PATENT DOCUMENTS

| | | |
|---|---|---|
| JP | 07-303164 A | 11/1995 |
| JP | 2003-060832 A | 2/2003 |
| JP | 2003-115957 A | 4/2003 |
| JP | 2003-163785 A | 6/2003 |

\* cited by examiner

*Primary Examiner*—Khanh Q Dinh
(74) *Attorney, Agent, or Firm*—Canon U.S.A., Inc. I.P. Division

(57) ABSTRACT

An image processor is capable of transferring an input job. The image processor receives input of jobs, displays a list of the jobs received, selects a job to be output to another image processor from the displayed list, and transfers the selected job to that another image processor.

19 Claims, 14 Drawing Sheets

BASIC SCREEN

FIG. 7

JOB-LIST SCREEN

| Receipt Number | Name of Document | Owner | Type of job | Mode | Output Destination | Status | Time/Date of Registration |
|---|---|---|---|---|---|---|---|
| 001 | Job 1 | KIMURA | Copy | Normal | Local | Waiting to print | 16:40:29 2001/07/05 |
| 002 | Report A | TANAKA | Print | Normal | Local | Waiting to print | 16:41:29 2001/07/05 |
| 003 | Plan A | SATO | Print | Normal | MFP2 | Generating | 16:42:29 2001/07/05 |
| 003 | Plan B | SATO | Remote | Normal | Local | Generating | 16:42:29 2001/07/05 |
| 000 | Unknown | Unknown | Unknown | Normal | Local | Unknown | |

Number of waiting jobs : 4

Select    Return

FIRST JOB SETTING SCREEN

SECOND JOB SETTING SCREEN

FIRST JOB SETTING SCREEN - Reflect output conditions on screen

SECOND JOB SETTING SCREEN - Setting of output conditions is not allowed

IMAGE PROCESSOR AND IMAGE PROCESSING METHOD

BACKGROUND OF THE INVENTION

1. Field of the Invention

The present invention relates to an image processor and an image processing method. More specifically, the present invention relates to a printing system including a plurality of image processors connected via a network and capable of communicating with each other, so as to transmit/receive jobs and output the jobs.

2. Description of the Related Art

With a recent dramatic development in a network technique, printers, fax machines, and scanners compatible with a network, or printing apparatuses, such as multifunction peripheral devices having these functions, have become practical. Also, a printing system for performing a printing operation by connecting these printing apparatuses via a network has been proposed.

FIG. 15 illustrates an example of confidential-mode printing and remote copy, which are generally performed using this type of printing system.

In the confidential-mode printing, user authentication is performed before a printing operation. For example, when a job is transmitted in a confidential mode from a host apparatus 141 to a printing apparatus 142, the printing apparatus 142 does not start a printing operation until user authentication (e.g., input of a password) has been successfully done.

In the remote-copy printing, a printing apparatus allows another printing apparatus to perform a printing operation. For example, in the remote-copy printing, when a printing apparatus 144 receives a copy operation, the printing apparatus 144 transmits a job of an image scanned by the printing apparatus 144 (remote-copy job) to a remote printing apparatus 143, and the printing apparatus 143 outputs the image based on the job.

In this type of generalized printing system, the following system and apparatus are known.

For example, Japanese Patent Laid-Open No. 2003-163785 discloses a network image forming system. In this system, when a local apparatus is performing a printing operation and when another copy or print job cannot be performed at once, the system checks the status of other apparatuses. Then, if an apparatus in a standby mode is found, the job is transferred to the apparatus.

Japanese Patent Laid-Open No. 2003-60832 discloses an image processor. In this image processor, in a case where an input job exceeds the ability of a local apparatus or where the local apparatus cannot perform a printing process due to breakdown or the like, a job history of another apparatus is searched for. If an apparatus capable of performing the input job is found, the job is transferred to the apparatus.

In these known arts, however, after input of a job to a printing apparatus has been confirmed, the job cannot be transferred to another apparatus. Therefore, if a printing apparatus in which input of a job has been confirmed is printing many other jobs, the user has to wait until the other jobs have been printed.

SUMMARY OF THE INVENTION

The present invention enables setting changes, such as change of transfer destination or confidential printing mode, for input jobs.

According to an aspect of the present invention, an image processor capable of transferring an input job is provided. The image processor receives input of new jobs, displays a list of the jobs received, selects a job to be output to another image processor from the displayed list of jobs, and transfers the selected job to that another image processor.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of the user interface of the image processor.

DESCRIPTION OF THE EMBODIMENTS

First Embodiment

Hereinafter, a first embodiment of the present invention will be described. In this embodiment, a multifunction peripheral (MFP) having multiple functions, such as a printing function, a copy function, and a scanner function, is used as an image processor. As an ordinary image processor, the MFP can receive input of a new job in a state that another job has already been input.

Figure 1:
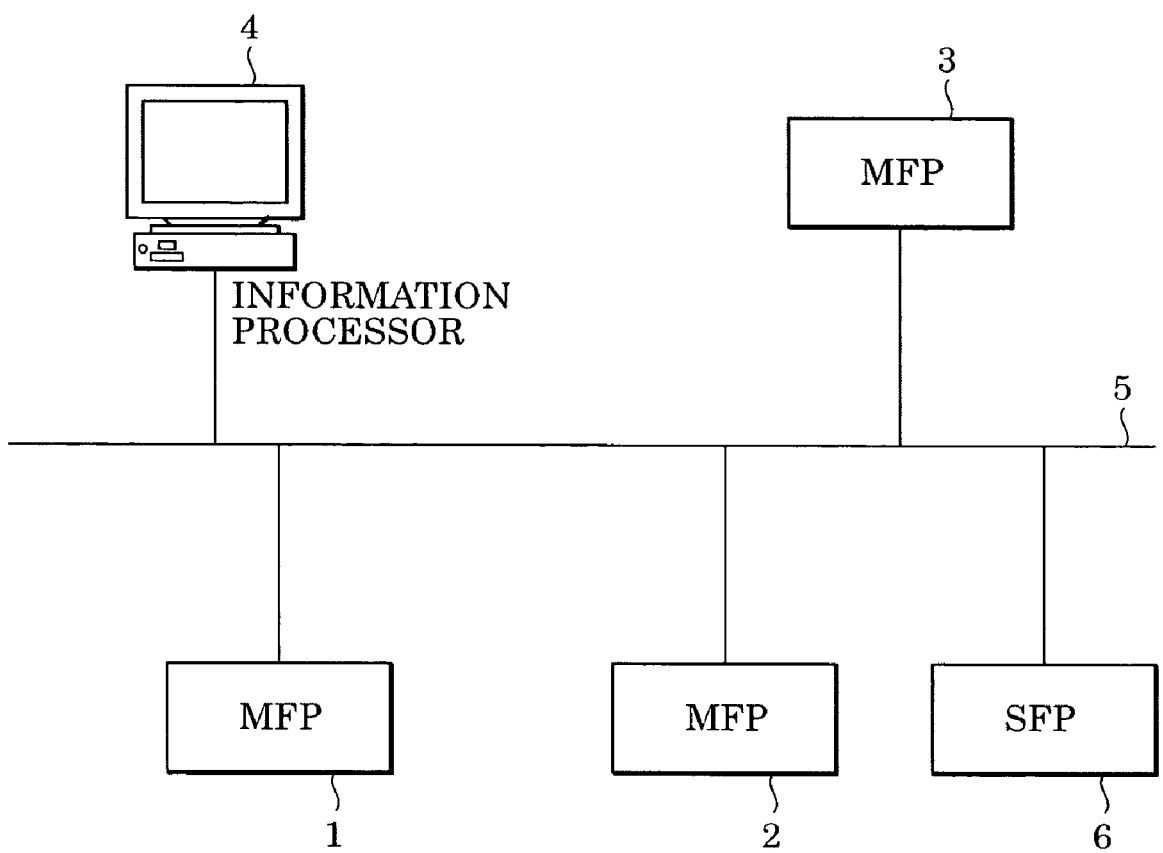
FIG. 1 shows an example of the configuration of a printing system to which the present invention is applied.

FIG. 1 is a block diagram showing the configuration of a printing system according to this embodiment.

In FIG. 1, the printing system includes MFP 1, MFP 2 and MFP 3, an information processor such as a personal computer (hereinafter referred to as PC) 4, a network 5 operated in a known protocol, and a single-function peripheral (in this case, a peripheral having only a printer function is used, and hereinafter referred to as SFP) 6.

MFP 1, MFP 2, MFP 3, the PC 4, and the SFP 6 are connected through the network 5 so as to form the printing system.

Figure 2:
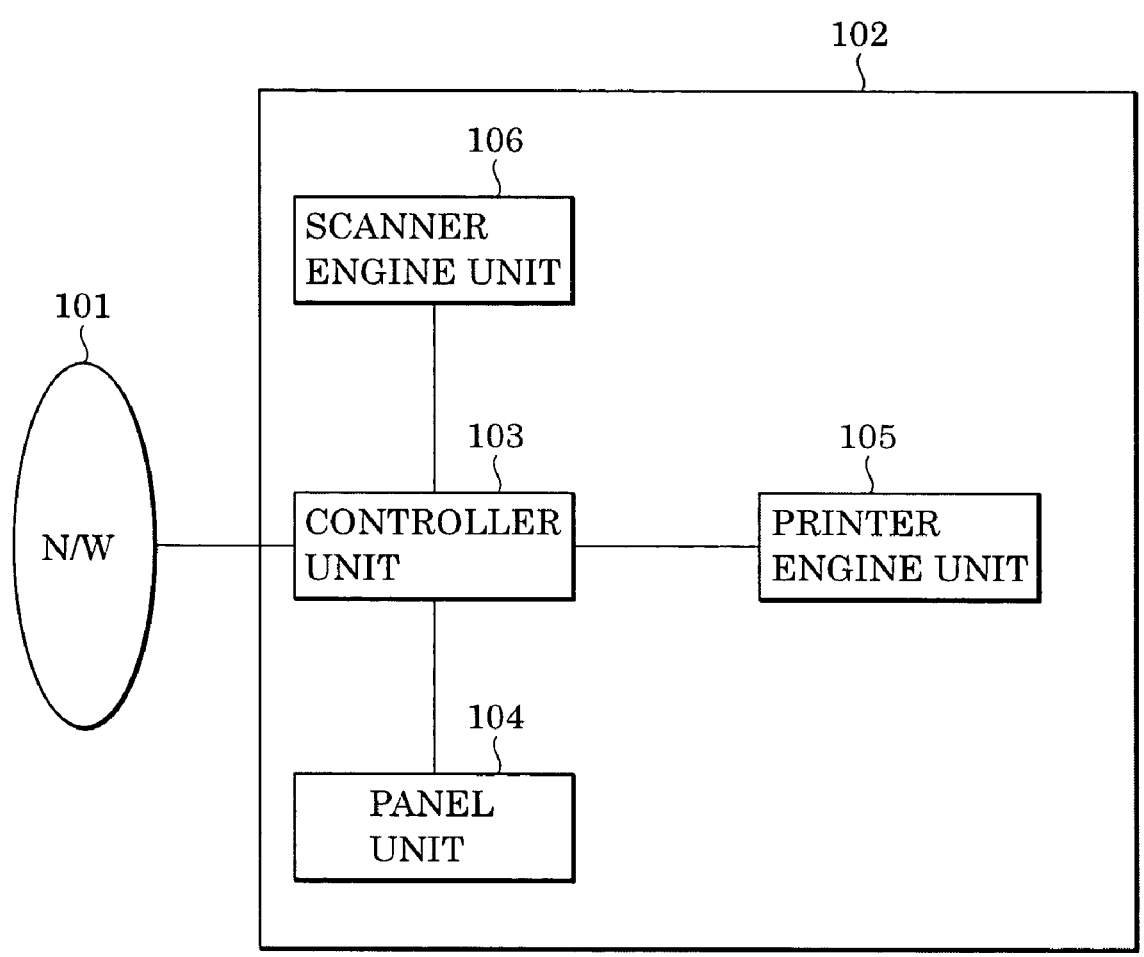
FIG. 2 shows an example of the configuration of an image processor to which the present invention is applied.

FIG. 2 is a block diagram showing the configuration of the MFP 1 (102) of this embodiment.

In this embodiment, MFP 1 to MFP 3 have the same configuration. In FIG. 2, an external apparatus group 101 includes the apparatuses other than MFP 1 (102) forming the printing system (that is, MFP 2, MFP 3, PC 4, and SFP 6) and the network 5.

MFP 102 includes a controller unit 103, a panel unit 104, a scanner engine unit 106, and a printer engine unit 105. The printer engine unit 105 forms a latent image on a photoconductive drum by a known electrophotography process based on image data (binary or multivalued data), and transfers and fuses the image to a sheet of paper so as to perform printing. The scanner engine unit 106 optically reads an image of a document so as to generate image data. The panel unit 104 serves as an interface for a user (operator) and includes a liquid crystal panel having a touch sensor and a keyboard (not shown). The user can provide instructions of a predetermined operation to the MFP 102 by operating the panel unit 104.

The controller unit 103 controls the panel unit 104, the printer engine unit 105, and the scanner engine unit 106. Further, the controller unit 103 communicates with and transmits/receives data to/from the external apparatus group 101.

The SFP 6 serves as a printer performing a printing operation in accordance with instructions from an external apparatus, and includes the same units as those in the MFP 102 shown in FIG. 2 except the scanner engine unit 106.

Figure 3:
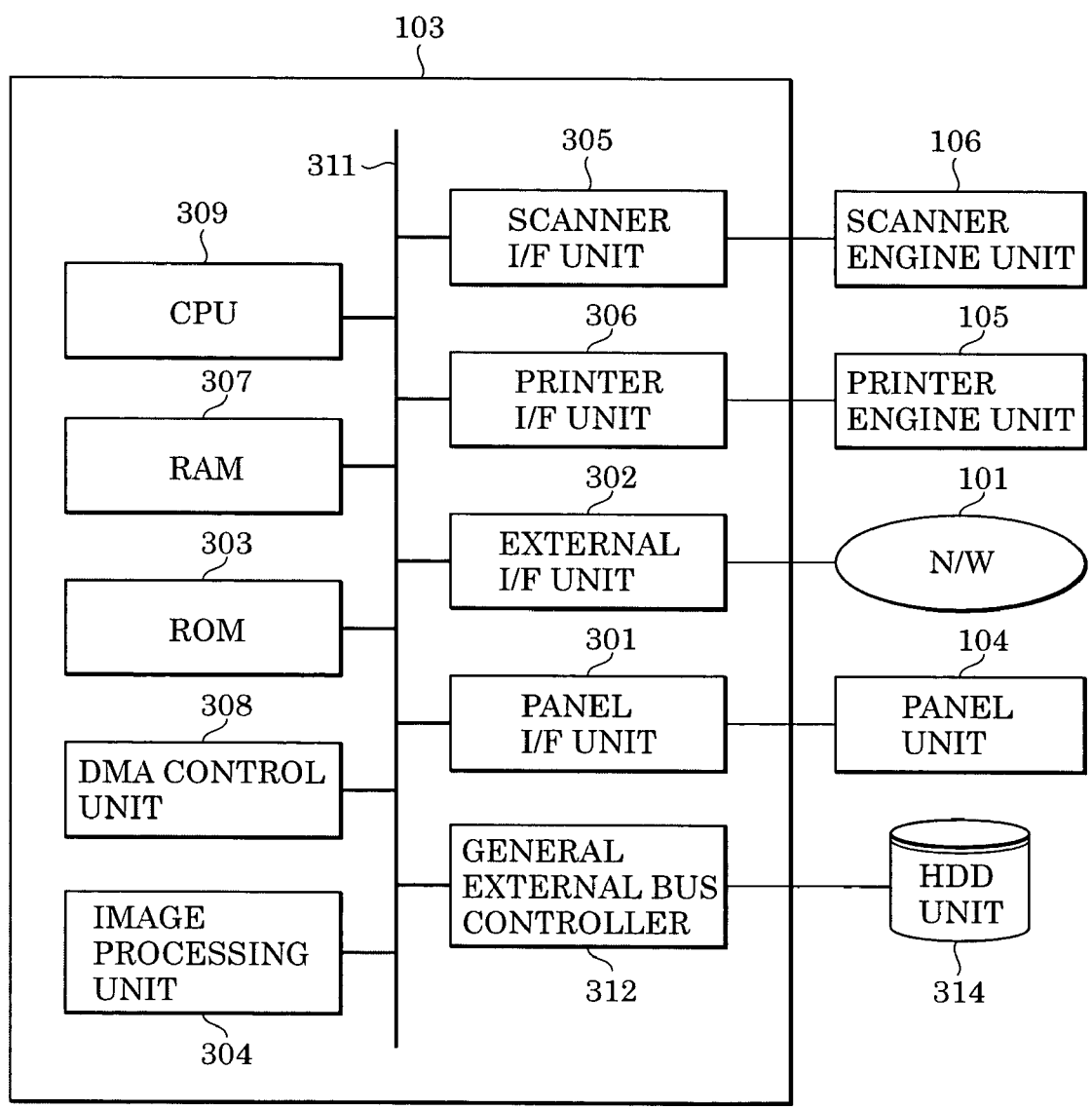
FIG. 3 is a block diagram showing an example of an electrical configuration of the image processor.

FIG. 3 is a block diagram showing the hardware structure of the controller unit 103.

A central processing unit (CPU) 309 controls the entire controller unit 103. A read-only memory (ROM) 303 stores control code of the CPU 309. A random-access memory (RAM) 307 for temporary storage is a storage device used by the CPU 309.

A direct memory access (DMA) control unit 308 can transfer data in the RAM 307, input/output data of an image processing unit 304, input data of a printer interface unit 306, and output data of a scanner interface unit 305, according to the instructions from the CPU 309.

The image processing unit 304 performs image rendering, image processing including color processing, and format conversion (encoding, decoding, compression, decompression, etc.).

A panel interface unit 301 performs data communication with the panel unit 104 and receives settings and instructions from the user through the panel unit 104.

An external interface unit 302 is used for communicating with the external apparatus group 101 and includes a data port for transmitting/receiving print data and a control port for exclusively transmitting/receiving control information in a hierarchy of logical communication. Transmitted/received data can be stored in a dedicated buffer memory in units of predetermined blocks, and can be used for data communication with the CPU 309.

The printer interface unit 306 serves as a signal input/output unit for the printer engine unit 105, and transmits a data signal from an output buffer register (not shown) and controls communication with the printer engine unit 105.

The scanner interface unit 305 serves as a signal input/output unit for the scanner engine unit 106, and transmits a data signal from an output buffer register (not shown) and controls communication with the scanner engine unit 106.

A system bus 311 includes an address bus and a data bus. As shown in FIG. 3, each unit connected to the system bus 311 can access (communicate with) each other.

In a general external bus controller 312, an IDE-compatible (integrated drive electronics-compatible) bus is used as a general external bus in this embodiment. However, the same advantages can be obtained if another method, such as SCSI (small computer system interface), is used.

A hard disk drive (HDD) unit 314 is connected to the system bus 311 through the general external bus controller 312, so that each unit connected to the system bus 311 can access the HDD unit 314. The CPU 309 performs access as a file system in a logical sense.

The control code for controlling the CPU 309 includes an OS (operating system) for performing time-division control in units of load modules called tasks by a system clock (not shown) and a plurality of load modules (tasks) operating in units of functions.

Figure 4:
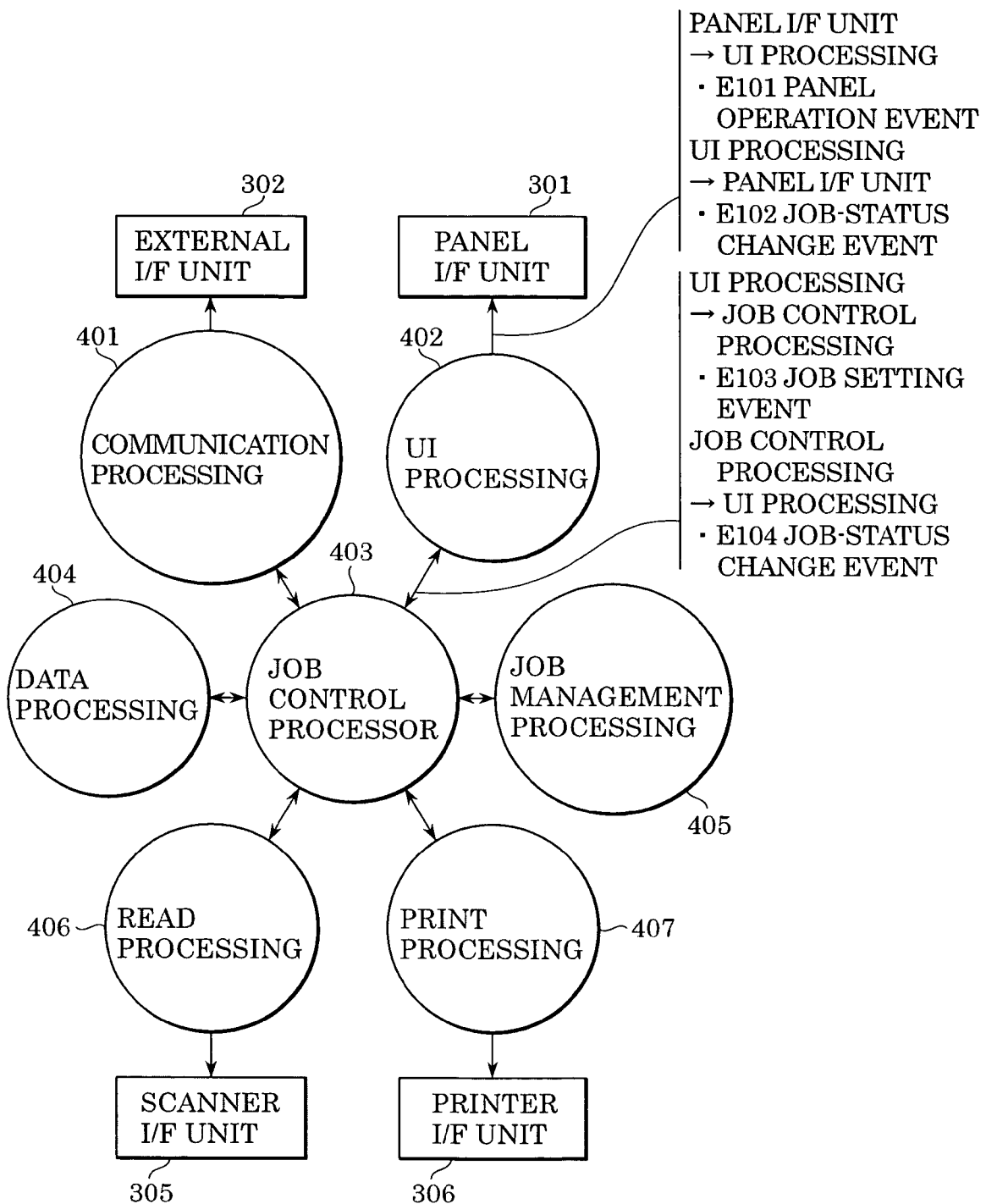
FIG. 4 is a block diagram showing an example of logical processing performed by the image processor.

FIG. 4 shows a control flow according to this embodiment.

In FIG. 4, each of communication processing 401, UI (user interface) processing 402, job control processing 403, data processing 404, job management processing 405, read processing 406, and print processing 407 is a unit of logical functional processing which is substantially executed by the CPU 309. The unit of functional processing may include an arbitrary number of tasks.

(Communication Processing)

The communication processing 401 manages data transmission/reception to/from the external apparatus group 101 through the external interface unit 302. The communication processing 401 interprets data transmitted from the external apparatus group 101 and notifies the job control processing 403 of job management information, job output conditions, and job print information, which will be described later. At the same time, the communication processing 401 transmits print data (PDL data, image data, etc.) regarding image formation to the data processing 404.

(UI Processing)

The UI processing 402 manages data transmission/reception to/from the panel unit 104 through the panel interface unit 301 and controls display in the panel unit 104. Various mode settings and control instructions input through the panel by the operator are transmitted as control data from the panel unit 104 to the panel interface unit 301, and the panel interface unit 301 issues a panel operation event E101 to the UI processing 402 according to the received data. The UI processing 402 changes the display on the panel unit 104 according to the type of the panel operation event E101. When the UI processing 402 recognizes that the panel operation event E101 is a setting operation regarding a job, the UI processing 402 issues a jog setting event E103 to the job control processing 403.

On the other hand, when the UI processing 402 receives a job-status change event E104 from the job control processing 403, the UI processing 402 issues a job-status change event E102 to the panel interface unit 301.

The job control processing 403 controls the communication processing 401, the UI processing 402, the data processing 404, the job management processing 405, the read processing 406, and the print processing 407 so as to realize the following operations:

the job control processing 403 controls the communication processing 401, the data processing 404, the job management processing 405, and the print processing 407 so as to realize a printer function;

the job control processing 403 controls the UI processing 402, the data processing 404, the job management processing 405, the read processing 406, and the print processing 407 so as to realize a copy function;

the job control processing 403 controls the UI processing 402, the data processing 404, the job management processing

405, the read processing 406, and the communication processing 401 so as to realize a scanner function;

the job control processing 403 controls the communication processing 401, the data processing 404, the job management processing 405, and the print processing 407 so as to realize printing of a job received from the MFP 2 or MFP 3; and the job control processing 403 controls the communication processing 401, the data processing 404, the job management processing 405, and the UI processing 402 so as to realize job transfer to the MFP 2 or MFP 3.

(Data Processing)

The data processing 404 controls the image processing unit 304 and performs the following processing according to the instructions from the job control processing 403. Also, the data processing 404 performs predetermined data processing (image conversion, image processing, compression, etc.) based on input data from the communication processing 401 or the read processing 406.

Further, the data processing 404 stores the data in a predetermined area of the HDD unit 314 or the RAM 307 and manages the data. Also, the data processing 404 performs predetermined data processing (image conversion, decompressing, etc.) on the data and transmits the data to the print processing 407.

(Job Management Processing)

The job management processing 405 manages a job management list 901, which will be described later, and adds/deletes information to/from a job management table 902 according to the instructions from the job control processing 403, so as to set or refer to information.

(Read Processing)

The read processing 406 manages data transmission/reception to/from the scanner engine unit 106 through the scanner interface unit 305. The read processing 406 notifies the scanner engine unit 106 of required control information in accordance with the instructions from the job control processing 403 and executes a read sequence by using a predetermined protocol by cooperating with the data processing 404. Also, the read processing 406 receives status information transmitted from the scanner engine unit 106 and transmits the information to the job control processing 403 as necessary.

(Print Processing)

The print processing 407 manages data transmission/reception to/from the printer engine unit 105 through the printer interface unit 306. The print processing 407 notifies the printer engine unit 105 of required control information in accordance with the instructions from the job control processing 403 and executes a print sequence by using a predetermined protocol by cooperating with the data processing 404. Also, the print processing 407 receives status information transmitted from the printer engine unit 105 and transmits the information to the job control processing 403 as necessary.

Figure 5:
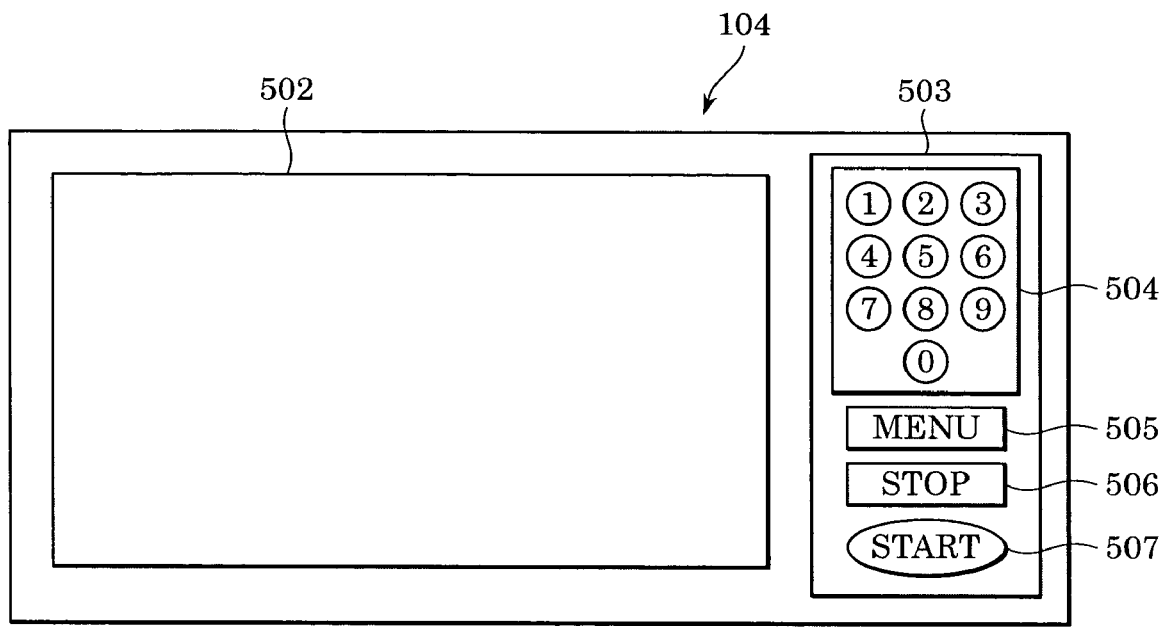
FIG. 5 shows an example of the configuration of a panel unit of the image processor.

FIG. 5 shows an exemplary panel unit 104 according to this embodiment.

A logical operation unit 502 includes a liquid crystal panel capable of displaying an image thereon and a touch sensor, and serves as a logical operation unit. A physical switch unit 503 includes physical push buttons (switches). A ten-key pad 504, a menu button 505, a stop button 506, and a start button 507 are included in the physical switch unit 503. The user operates the logical operation unit 502 and each button in the physical switch unit 503 of the panel unit 104 so as to provide various settings and instructions to the MFP.

Next, examples of display in the logical operation unit 502 according to this embodiment will be described with reference to FIGS. 6 to 9B.

Figure 6:
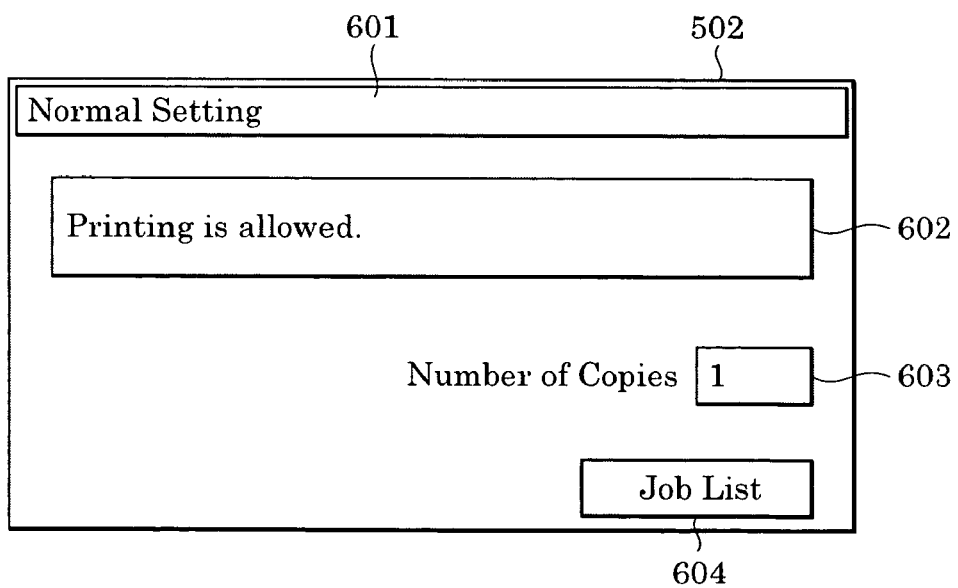
FIG. 6 shows an example of a user interface of the image processor.

FIG. 6 shows a basic screen displayed in the logical operation unit 502.

A screen explaining area 601 includes an apparatus-status section 602, a number-of-copies section 603, and a transition button 604 to a job-list screen, which will be described later (hereinafter referred to as a job-list button).

FIG. 7 shows an example of the job-list screen displayed in the logical operation unit 502.

The status of jobs are displayed in a job-status section 701, and a job-status explaining section 702 explains the displayed information.

A scroll bar 703 is used for selecting a job from among a plurality of displayed jobs. As shown in the figure, a selected job is highlighted in the job-status section 701. Further, the job-list screen includes a transition button 704 to a job-setting screen for a selected job, which will be described later, (hereinafter referred to as a selection button) and a transition button 705 to a basic screen (hereinafter referred to as a return button). A number-of-jobs section 706 displays the number of jobs displayed in the job-status section 701.

FIGS. 8A to 9B show job-setting screens displayed in the logical operation unit 502.

Figure 8A:
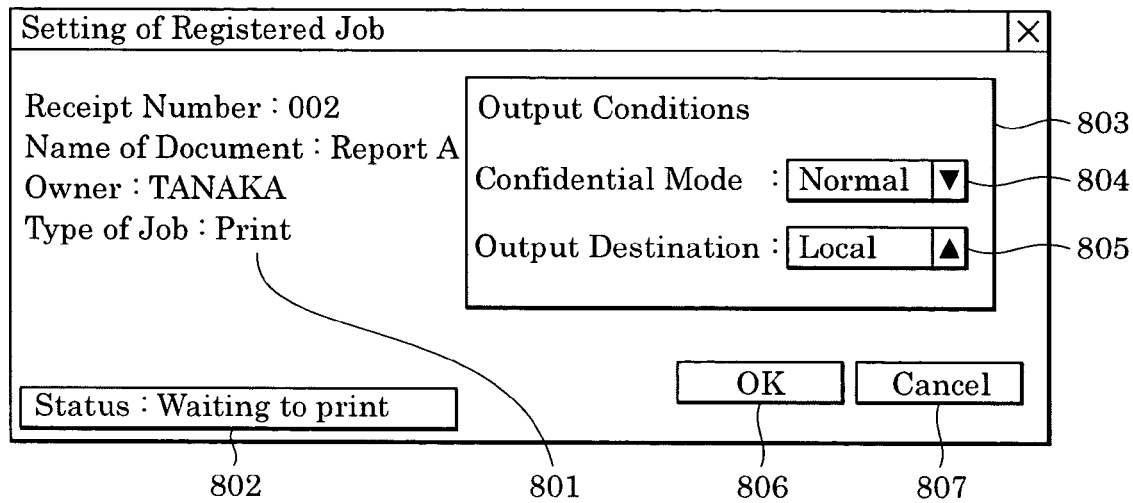
FIGS. 8A and 8B show examples of the user interface of the image processor.
Figure 8B:
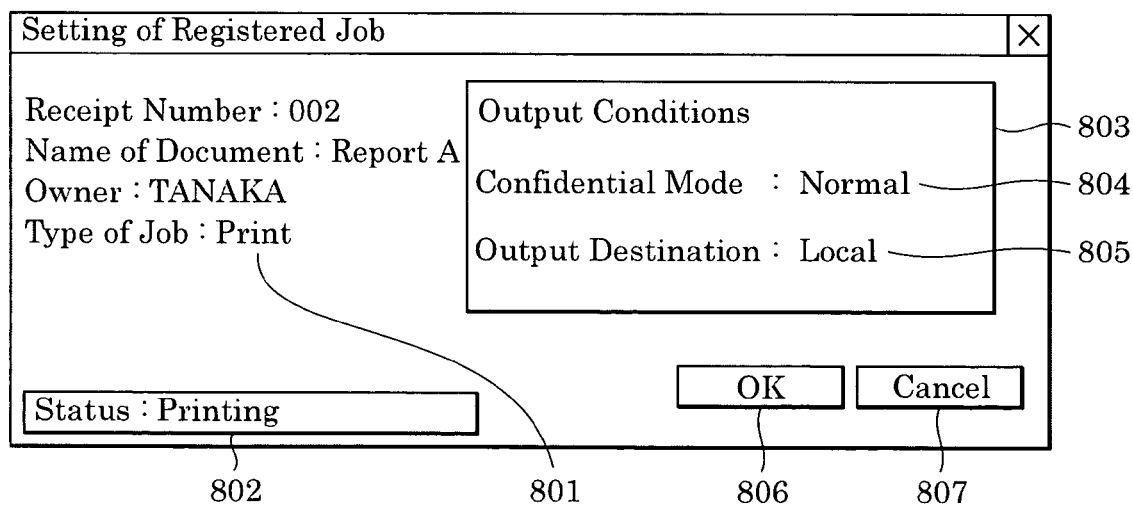

A first job-setting screen shown in FIG. 8A is displayed when output conditions of a corresponding job can be changed, and a second job-setting screen shown in FIG. 8B is displayed when output conditions of a corresponding job cannot be changed.

A job-information section 801 displays information of a job that cannot be changed. A job-status section 802 displays the status of the job. A job setting section (referred to as output conditions) 803 displays changeable setting of the job.

A confidential-mode setting 804 is a list box for displaying the setting status of a confidential mode and accepting setting of a confidential mode or a non-confidential (normal) mode. An output-destination setting 805 is a list box for displaying the setting status of an output destination and accepting change of the output destination.

A confirmation button (referred to as an OK button) 806 is used for confirming the content of the job setting section 803. A transition button (referred to as a cancel button) 807 is used for moving to the job-list screen (described later).

Figure 9A:
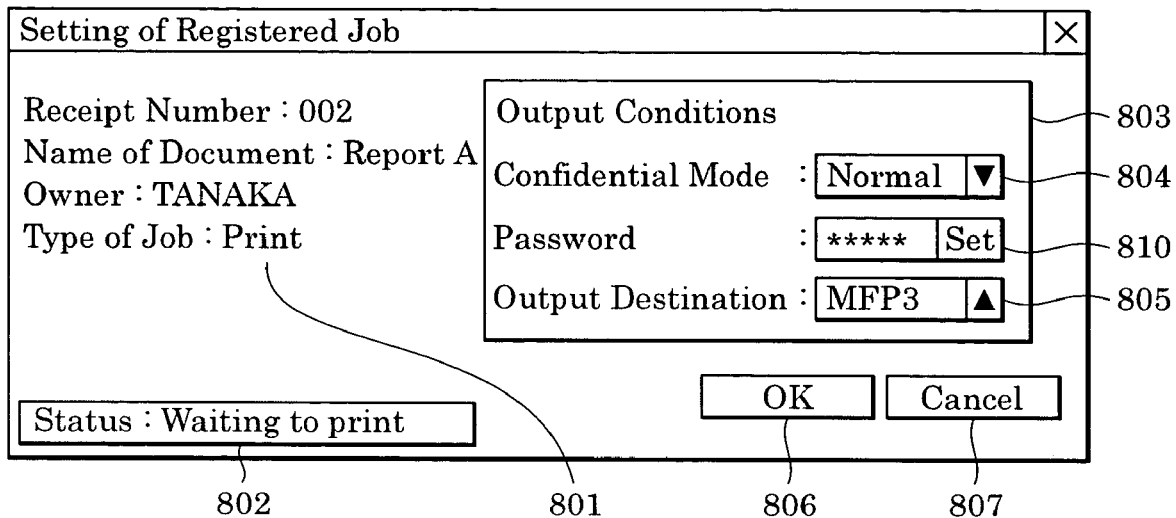
FIGS. 9A and 9B show examples of the user interface of the image processor.
Figure 9B:
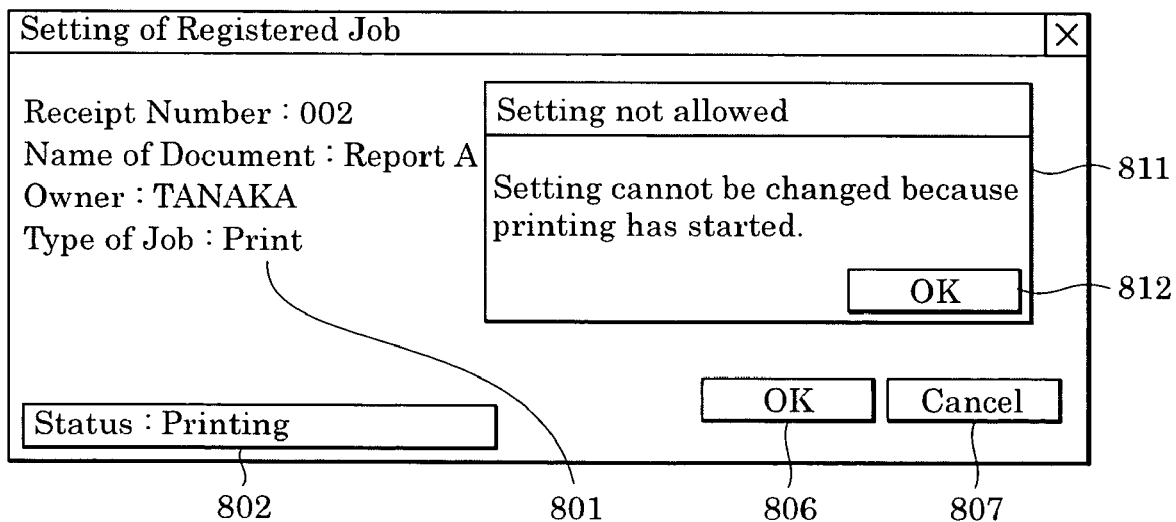

In order to set the confidential mode, the user selects the confidential mode in the confidential-mode setting 804 and then pushes the OK button 806. With this operation, a password section 810 for allowing the user to set a password is displayed, as shown in FIG. 9A. After setting the password, the user has to input the password to a printing apparatus in order to print the confidential-mode job. If the setting cannot be accepted after the OK button 806 has been pushed, a notice 811 indicating that setting cannot be performed is displayed as shown in FIG. 9B. The screen changes to the job-setting screen after an OK button 812 has been pushed.

Figure 10:
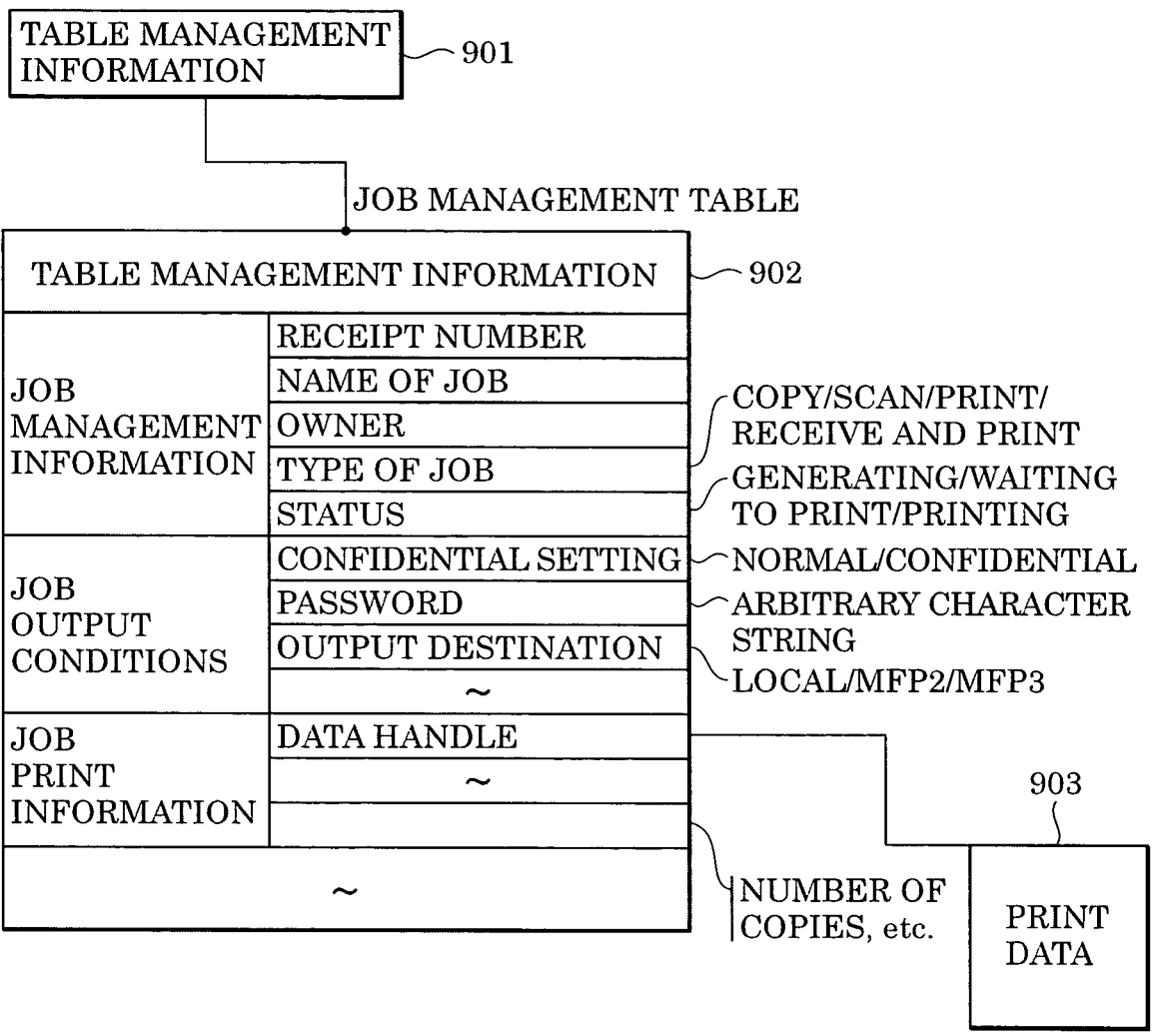
FIG. 10 shows an example of a data structure of the image processor.

FIG. 10 shows an example of a table managed by the job management processing 405.

The job management list 901 manages the job management table 902 based on table management information. The job management processing 405 generates the job management table 902 after a job has been registered and links the table with job data (print data) to be printed. The job management list 901 manages the accepted job management table in a list form.

The job management table 902 includes table management information for managing the structure of the table, job management information for recognizing and specifying a job, job output conditions set for printing a job, and job print information including data and layout information for printing a job.

The job management information includes a receipt number, the name of job, an owner, the type of job, a status, and a location where print data is stored. The type of job means the type of service, such as copy, scan, or print. The status indicates "generating", "waiting to print", and "printing", each having the following meaning:

generating: data is being generated;

waiting to print: a printing operation can be started at anytime, that is, a standby status; and printing: a job is being printed.

Herein, a printing operation means a process of transferring ink onto a sheet of paper.

The job output conditions include a confidential setting, a password, and an output destination. In the confidential setting, a normal mode (non-confidential printing) or a confidential mode (confidential printing) can be selected. The password is composed of an arbitrary character string and is used for obtaining permission to start a printing operation in the confidential mode. The output destination can be set to the local apparatus, the MPF 2, the MPF 3, or the SPF 6.

The job print information includes handle information for print data 903 in various formats used in a printing operation and information about the number of copies to be printed.

Figure 11:
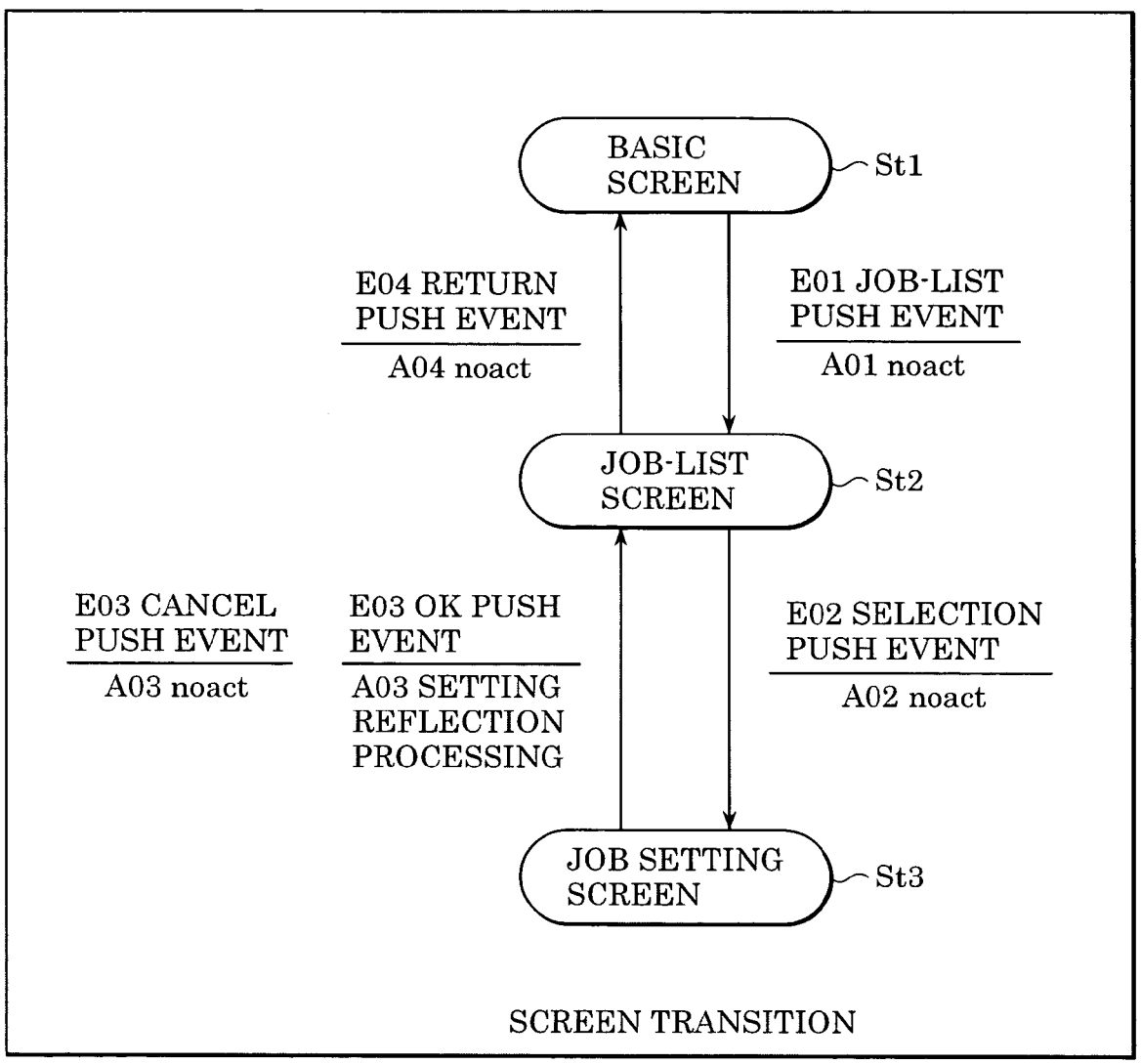
FIG. 11 shows an example of screen transition in the image processor.

FIG. 11 illustrates transition of screens and triggers in the logical operation unit 502 shown in FIGS. 6 to 9B. The transition of screens is realized by the UI processing 402 according to event information transmitted from the job control processing 403 and the panel interface unit 301.

A basic screen St1 appears after power-up. Then, when the job-list button 604 is pushed, the panel interface unit 301 issues a job-list push event E01. In response to this event, the screen changes to a job-list screen St2.

In the job-list screen St2, when the selection button 704 is pushed, the panel interface unit 301 issues a selection push event E02. In response to this event, the screen changes to a job setting screen St3. On the other hand, when the return button 705 is pushed, the screen changes to the basic screen St1.

In the job setting screen St3, when the OK button 806 is pushed, an OK push event E03 is generated and a setting reflection process is performed and the screen changes to the job-list screen St2. In the setting reflection process, a notice that setting cannot be performed 811 is displayed to the user if the setting cannot be accepted, so that the user can understand it, and setting values are set to job output conditions by the consent of the user.

In the job setting screen St3, when the cancel button 807 is pushed, a cancel push event E03 is generated and the screen changes to the job-list screen St2 without performing any processing.

Figure 12:
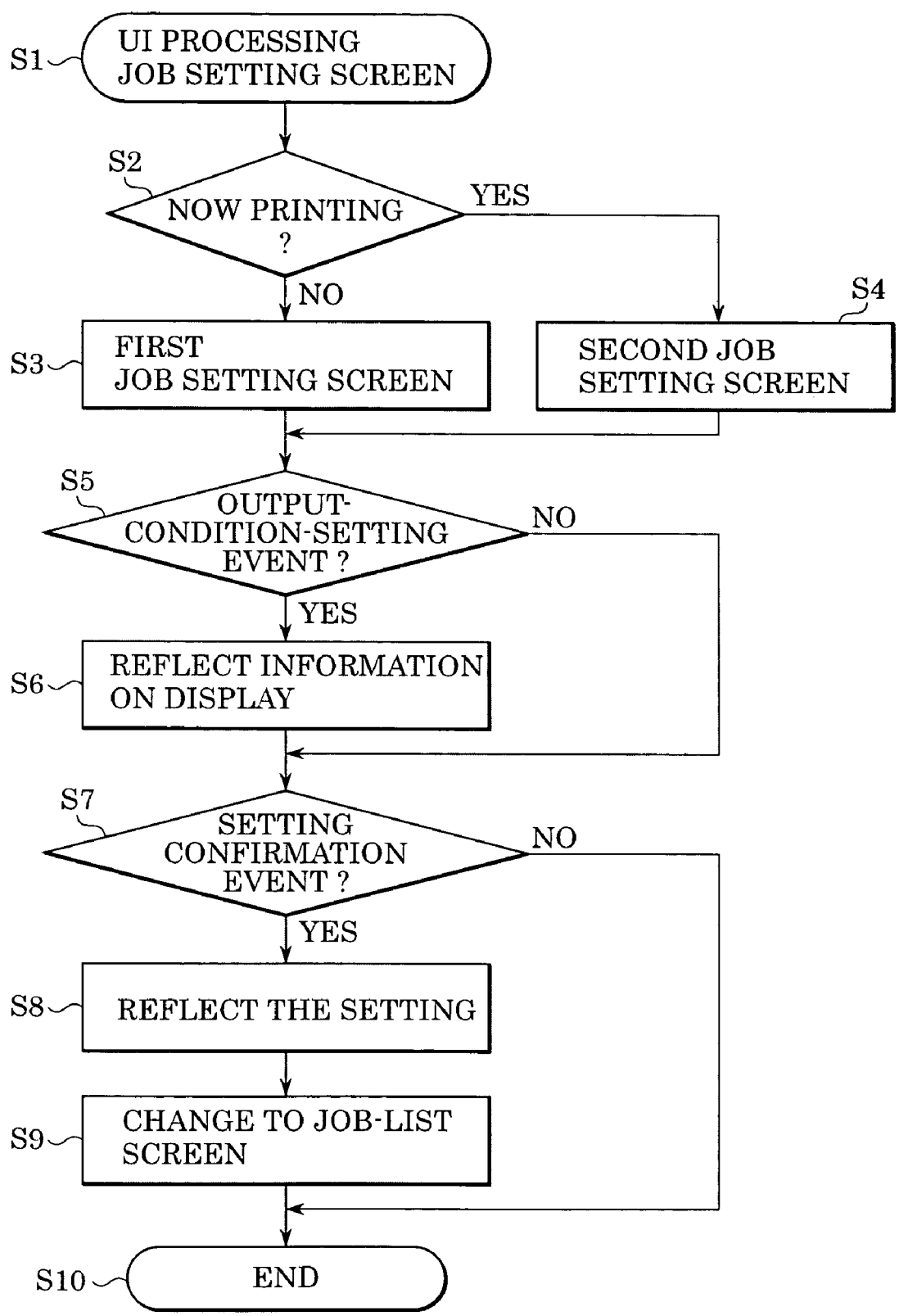
FIG. 12 is a control flowchart in a first embodiment.

FIG. 12 is a flowchart of the UI processing 402.

The UI processing 402 receives a panel operation set by the user as an event from the panel interface unit 301 and receives change of a job status as an event from the job control processing 403. This flowchart illustrates operations performed when the UI processing 402 receives these events in the job setting screen St3. The steps in the flowchart are performed from step S1 every time an event is received.

The UI processing 402 receives an event in the job setting screen St3 (S1). If the received event is a job-status change event E104, the second job setting screen shown in FIG. 8B is displayed again if the objective job is being printed (S4), and the first job setting screen shown in FIG. 8A is displayed again if the objective job is not being printed (S3).

If the received event is a panel operation event E101 and if its details indicate output-condition setting event (yes in S5), the setting information is reflected on the display (S6). At this time, if the second job setting screen is displayed, the setting information is ignored.

If the received event is a panel operation event E101 and if its details indicate output-condition-setting confirmation event (yes in S7), the setting is reflected in the job management table 902 via the job control processing 403 (S8). However, if the job status changes to "printing" while the setting is being reflected, the setting is not reflected. Then, the screen changes to the job-list screen St2 (S9) and the process is completed (S10).

As described above, in the printing system including the MFP 1, the MFP 2, the MFP 3 and the SFP 6, the MFP 1 can accept a plurality of reservations of jobs, list the reserved jobs, and select between a remote output and a local output and between a confidential mode and a non-confidential mode for each job. The MFP 1 can accept the selection until just before a printing operation starts.

The MFP 2 and MFP 3 can perform the same operation as in the MFP 1. Therefore, after the user inputs jobs to one of the apparatuses, he/she can transfer the jobs to another apparatus in accordance with the amount of jobs accumulated in the apparatus.

Also, after the user inputs jobs to one of the apparatuses, he/she can go away from the apparatus after selecting a confidential mode in accordance with the amount of jobs accumulated in the apparatus.

Also, after the user inputs jobs to one of the apparatuses, he/she can transfer the jobs to another apparatus after selecting a confidential mode in accordance with the amount of jobs accumulated in the apparatus and the other apparatuses.

Further, by forming the system by the apparatuses capable of performing the same job operation, such as the MFP 1 to the MFP 3, change of output destination or setting of confidential mode can be performed from any apparatus to another. Accordingly, concentration of usage in one apparatus can be prevented, and a significant advantage of more efficient processing of print jobs can be obtained. By operating this system, the convenience and productivity of the system can be improved.

Second Embodiment

A second embodiment of the present invention is described next. In this embodiment, same reference numerals as those in the first embodiment denote the same parts in the drawings, and the difference between the first and second embodiments will be described below.

Figure 13:
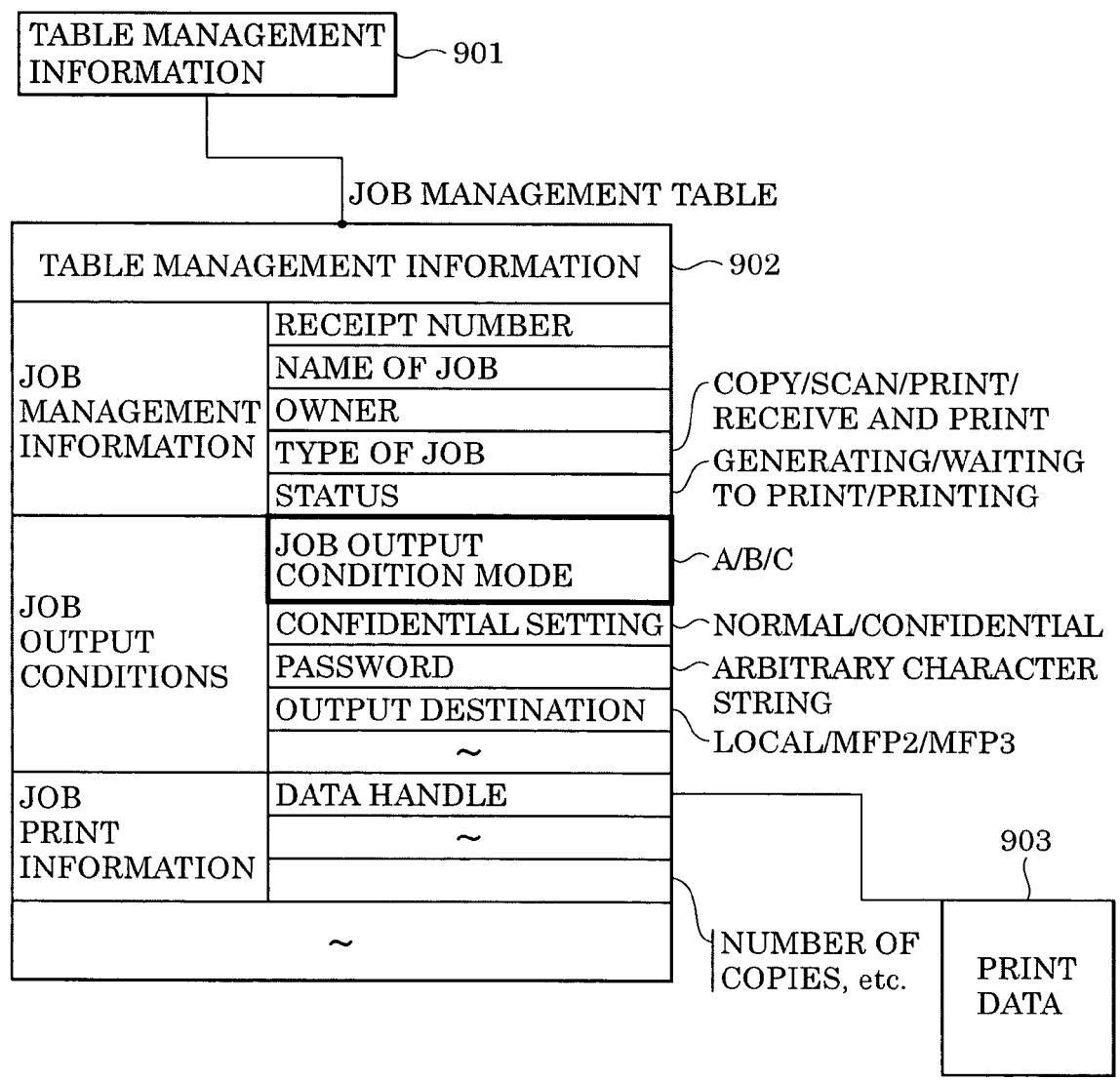
FIG. 13 shows a data structure in a second embodiment.

In this embodiment, as shown in FIG. 13, a job output condition mode is added to the job output conditions shown in FIG. 10. The job output condition mode is selectively set to mode A, mode B, or mode C.

In this embodiment, mode A is equivalent to the mode in the first embodiment.

Mode B inhibits coexistence of the confidential mode and remote output, and guides the setting so that a job in the confidential mode is always printed by a local apparatus. Also, mode B guides the setting so that a job set for a remote apparatus is always printed in the non-confidential mode. This mode is effective when a printing apparatus in the printing system cannot always receive confidential printing.

Mode C forces the confidential mode for every remote output, and guides the setting so that a job set for a remote apparatus is always printed in the confidential mode. When a job is output in a remote apparatus, people other than the owner of the job are likely to see the job, and thus mode C is effective when security of the remote output should be enhanced.

In the logical operation unit 502, the basic screen changes to a menu screen (not shown) when the menu button 505 is pushed. The job output condition mode can be set in this menu screen. Alternatively, each mode can be set automatically according to the ability of an apparatus used for remote output (for example, whether the apparatus can accept the confidential mode). The UI processing 402 in this embodiment restricts the relationship between the confidential setting and the remote setting according to the job output condition mode in "reflection on display" (S6) in the flowchart shown in FIG. 12.

Figure 14:
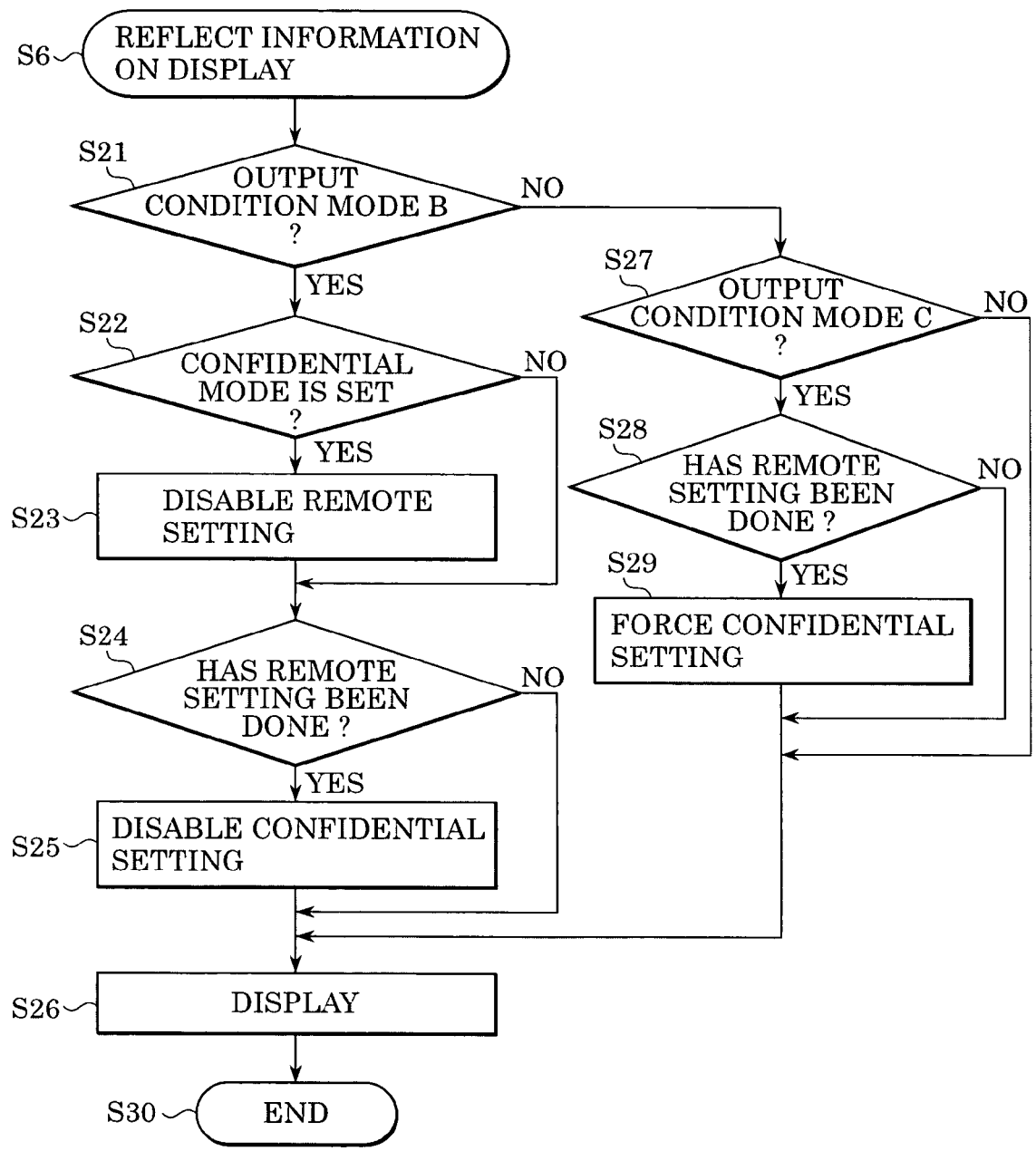
FIG. 14 is a control flowchart in the second embodiment.
Figure 15:
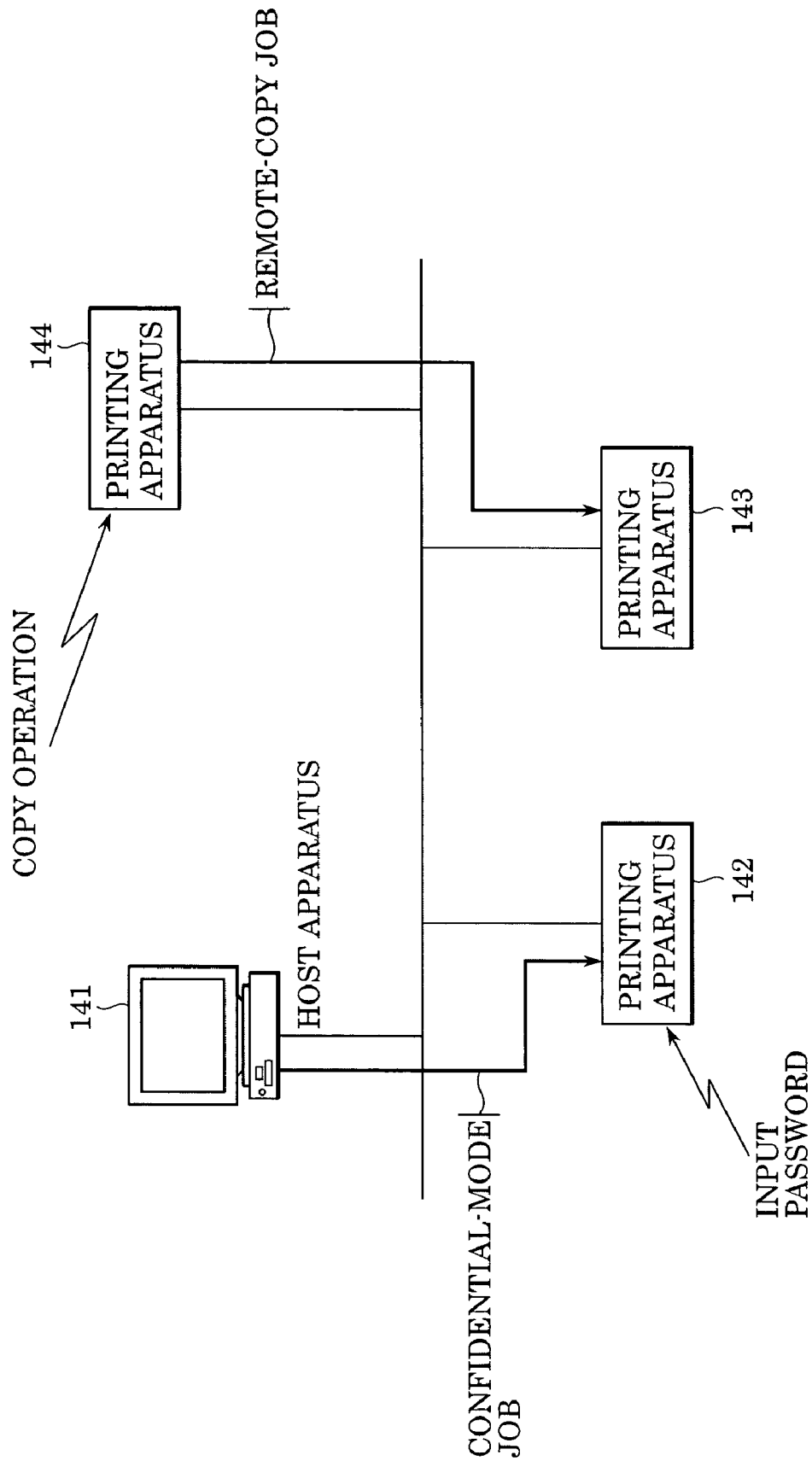
FIG. 15 illustrates a known art.

FIG. 14 is a flowchart of the UI processing 402 and illustrates a process of "reflection on display" (S6) in FIG. 12 of this embodiment.

In reflection on display (S6), in a case where the output condition mode is mode B (yes in S21), if the confidential mode has been set in the job management table (yes in S22), new remote setting is disabled (S23). Processing then proceeds to S24. If the output condition mode is mode B (yes in S21), but the confidential mode has not been set in the job management table (no in S22), processing proceeds directly to S24 (without disabling remote setting). If remote output has been set in the job management table (yes in S24), new setting of confidential mode is disabled (S25) and processing proceeds to S26 where display is performed. On the other hand, if remote output has not been set in the job management table (no in S24), processing proceeds directly to S26 where display is performed (new setting of confidential mode is not disabled.)

In a case where the output condition mode is mode C (yes in S27), if remote output has been set in the job management table (yes in S28), the confidential mode is forcefully set (S29) and display is performed (S26). On the other hand, if the output condition mode is mode C (yes in S27), but remote output has not been set in the job management table (no in S28), processing proceeds directly to S26 and display is performed (without the confidential mode being forcefully set).

In a case where the output condition mode is mode A (no in S21 and no in S27), the process skips to step S26 and display is performed.

As described above, in the printing system including the MFP 1 to the MFP 3, the MFP 1 can restrict the relationship between the confidential mode and remote output according to the job output condition mode.

Third Embodiment

A third embodiment of the present invention is described next. In this embodiment, same reference numerals as those in the first embodiment denote the same parts in the drawings, and the difference between the first and third embodiments will be described below.

In the third embodiment, assume that the UI processing 402 in the MFP 1 displays a job setting screen and that the type of job is printing of a received remote job. In that case, the second job setting screen is unconditionally displayed so that the setting cannot be changed.

Accordingly, the MFP 1 of this embodiment can inhibit setting changes for a job transferred from the MFP 2 or MFP 3.

Fourth Embodiment

A fourth embodiment of the present invention is described next. In this embodiment, same reference numerals as those in the first embodiment denote the same parts in the drawings, and the difference between the first and fourth embodiments are described below.

In this embodiment, the UI processing 402 in the MFP 1 displays a screen for authenticating the operator before changing to the job setting screen in order to authenticate the name of the owner based on a predetermined ID and password.

If the authenticated name of owner matches the name of owner described in the job management information in the job management table 902 of the object job, the first job setting screen is displayed. Otherwise, the second job setting screen is displayed.

In this embodiment, change of output destination or mode is accepted for only a job in which user authentication has been successfully done. Accordingly, a right to change the job output conditions is given only to the owner of the job.

Other Embodiments

The present invention is not limited to the above-described embodiments and other various embodiments can be adopted. For example, apparatuses other than the MFP 1, the MFP 2, the MFP 3 and the SFP 6 may be used if the apparatuses have a function of printer, copying machine, scanner, or fax machine. In that case, too, the advantages of the present invention can be obtained.

Also, a process of transferring a job from the MFP to the SFP can be performed in the same manner as in the above-described embodiments.

The present invention may be applied to a system including a plurality of apparatuses (for example, host computer, interface apparatus, reader, and printer) or to a single apparatus (for example, copying machine, printer, or fax machine).

The present invention can be achieved when a computer (or CPU or MPU (micro-processing unit)) in a system or an apparatus reads and executes program code, which realizes the functions and processes of the flowcharts of the above-described embodiments, stored in a storage medium.

In that case, the program code read from the storage medium realizes the functions of the above-described embodiments.

Examples of the storage medium for providing the program code include a floppy disk, a hard disk, an optical disk, a magneto-optical disk, a CD-ROM (compact disk-read-only memory), a CD-R (compact disk-recordable), a magnetic tape, a nonvolatile memory card, and a ROM.

The functions of the above-described embodiments are realized when a computer reads and executes the program code. Alternatively, an operating system (OS) operated in the computer may execute part of or the entire actual processing based on the instructions of the program code, so that the functions of the above-described embodiments can be realized.

Further, after the program code read from the storage medium is written in a memory in an expansion board inserted into the computer or an expansion unit connected to the computer, a CPU or the like included in the expansion board or expansion unit may execute part of or the entire actual processing based on the instructions of the program code, so that the functions of the above-described embodiments can be realized.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-393079 filed on Nov. 21, 2003, which is hereby incorporated by reference herein.

What is claimed is:

1. A printer comprising:
   a receiving unit adapted to receive a print job;
   a storing unit adapted to store a plurality of the print jobs received by the receiving unit;
   a printing unit adapted to execute a print process of the print job stored by the storing unit;
   a display unit adapted to display the plurality of the print jobs stored by the storing unit;
   a selecting unit adapted to select one of the print jobs displayed by the display unit;
   a status obtaining unit adapted to obtain a status of the print job selected by the selecting unit;
   an output-destination accepting unit adapted to accept an instruction that the selected print job is transmitted to another printer in a case where the status of the selected print job is that the selected print job is not being printed;
   a restricting unit adapted to restrict the transmission of the selected print job to another printer in a case where the status of the selected print job is that the selected print job is being printed; and
   a control unit adapted to transmit, to another printer, the print job whose instruction is accepted by the output-destination accepting unit, and cause the another printer to execute a print process of the transmitted print job.

2. A printer according to claim 1, wherein the output-destination accepting unit accepts setting of the output destination to another printer if the selected print job is not a job that has been transferred from another printer.

3. A printer according to claim 1 further comprising a setting unit adapted to set a confidential mode in which a password is input by a user in a case where the print process of the print job selected by the selecting unit is executed.

4. A printer according to claim 3, wherein the setting unit sets the confidential mode for print jobs that are not currently being printed.

5. A printer according to claim 3, wherein the setting unit sets the confidential mode for print jobs that have been set to be transmitted to another printer.

6. A printer according to claim 3, wherein the setting unit does not set the confidential mode for print jobs that have been set to be transmitted to another printer.

7. A printer according to claim 3, wherein the output-destination accepting unit sets the output destination of print jobs with the confidential mode set to confidential by the setting unit to a local apparatus.

8. A printer according to claim 3, further comprising:
   a job-output-condition accepting unit adapted to accept setting of an output condition of the print job; and
   a limiting unit adapted to limit setting by the setting unit in accordance with the output condition accepted by the job-output-condition accepting unit.

9. A printer according to claim 1, wherein the printer is a multifunction apparatus including at least two functions selected from among a printer function for outputting a print job received from an information processor, a scanner function, a copy function, and a facsimile function.

10. A printer according to claim 1, wherein the receiving unit receives the print job from an information processing apparatus or a scanner.

11. A printer comprising:
    a receiving unit adapted to receive a print job;
    a storing unit adapted to store a plurality of the print jobs received by the receiving unit; a printing unit adapted to execute a print process of the print job stored by the storing unit;
    a display unit adapted to display the plurality of the print jobs stored by the storing unit;
    a selecting unit adapted to select one of the print jobs displayed by the display unit;
    a status obtaining unit adapted to obtain a status of the print job selected by the selecting unit;
    a confidential-mode accepting unit adapted to accept, for the selected print job, setting of a confidential mode in which a password is input by a user when the print process of the selected print job is executed in a case where the status of the selected print job is that the selected print job is not being printed;
    a restricting unit adapted to restrict, for the selected print job, the setting of the confidential mode in a case where the status of the selected print job is that the selected print job is being printed; and
    a setting unit adapted to set the confidential mode in a case where the confidential-mode accepting unit accents the setting of the confidential mode.

12. A printer according to claim 11, wherein the setting unit sets the confidential mode for print jobs that are not currently being printed.

13. A printer according to claim 11, wherein the setting unit sets the confidential mode for print jobs that have been set to be transmitted to another printer.

14. A printer according to claim 11, wherein the receiving unit receives the print job from an information processing apparatus or a scanner.

15. A method performed by a printer, the method comprising:
    receiving a plurality of print jobs;
    storing the plurality of received print jobs;
    displaying the plurality of the stored print jobs;
    selecting one of the displayed print jobs;
    obtaining a status of the selected print job;
    accepting an instruction that the selected print job is transmitted to another printer in a case where the status of the selected print job is that the selected print job is not being printed;
    restricting transmission of the selected print job to another printer in a case where the status of the selected print job is that the selected print job is being printed;
    transmitting, to another printer, the print job whose instruction is accepted; and
    causing the another printer to execute a print process of the transmitted print job.

16. A method according to claim 15 further comprising setting a confidential mode in which a password is input by a user in a case where the print process of selected print job is executed.

17. A computer-readable storage medium having stored thereon a program for allowing a printer to execute steps according to the method of claim 15.

18. A method performed by a printer, the method comprising:
- receiving a plurality of print jobs;
- storing the plurality of received print jobs;
- displaying the plurality of stored print jobs;
- selecting one of the displayed print jobs;
- obtaining a status of the selected print job;
- accepting, for the selected print job, setting of a confidential mode in which a password is input by a user when the print process of the selected print job is executed in a case where the status of the selected print job is that the selected print job is not being printed;
- restricting, for the selected print job, the setting of the confidential mode in a case where the status of the selected print job is that the selected print job is being printed; and
- setting a confidential mode in a case where setting of the confidential mode is accepted.

19. A computer-readable storage medium having stored thereon a program for allowing a printer to execute steps according to the method of claim 18.

* * * * *